United States Patent
Nogami (10) Patent No.: US 11,318,559 B2
(45) Date of Patent: May 3, 2022

(54) LASER MACHINING SYSTEM

(71) Applicant: FANUC CORPORATION, Yamanashi (JP)

(72) Inventor: Takeshi Nogami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 186 days.

(21) Appl. No.: 16/587,083

(22) Filed: Sep. 30, 2019

(65) Prior Publication Data

US 2020/0114467 A1 Apr. 16, 2020

(30) Foreign Application Priority Data

Oct. 11, 2018 (JP) .............................. JP2018-192658

(51) Int. Cl.
*B23K 26/082* (2014.01)
*B23K 26/38* (2014.01)
*B23K 26/08* (2014.01)

(52) U.S. Cl.
CPC ........ *B23K 26/082* (2015.10); *B23K 26/0853* (2013.01); *B23K 26/38* (2013.01)

(58) Field of Classification Search
CPC ... B23K 26/082; B23K 26/38; B23K 26/0853
USPC ............... 219/121.61, 121.73, 121.74, 121.8
See application file for complete search history.

(56) References Cited

U.S. PATENT DOCUMENTS

| | | |
|---|---|---|
| 2006/0060573 A1 | 3/2006 | Becker et al. |
| 2018/0056443 A1 * | 3/2018 | Kramer .................. G05B 19/19 |

FOREIGN PATENT DOCUMENTS

| | | | |
|---|---|---|---|
| JP | S62-144891 A | | 6/1987 |
| JP | 2005-246392 A | | 9/2005 |
| JP | 2005246392 A | * | 9/2005 |
| JP | 2010-214393 A | | 9/2010 |

OTHER PUBLICATIONS

An Office Action; "Notice of Reasons for Refusal," mailed by the Japanese Patent Office dated Jul. 21, 2020, which corresponds to Japanese Patent Application No. 2018-192658 and is related to U.S. Appl. No. 16/587,083 ; with English language translation.
An Office Action mailed by China National Intellectual Property Administration dated Nov. 5, 2021, which corresponds to Chinese Patent Application No. 201910955000.X is related to U.S. Appl. No. 16/587,083; with English language translation.

* cited by examiner

*Primary Examiner* — Thien S Tran
(74) *Attorney, Agent, or Firm* — Studebaker & Brackett PC (57) ABSTRACT

A laser machining system includes: a laser irradiation device that irradiates a workpiece with a laser beam; a workpiece moving device that moves the workpiece; a laser irradiation controller that controls the laser irradiation device to control an irradiation position of the laser beam; and a workpiece move controller that controls the workpiece moving device to control at least one of the position and the posture of the workpiece. The workpiece move controller transmits information about at least one of the position and the posture of the workpiece to the laser irradiation controller. The laser irradiation controller compensates for the irradiation position of the laser beam based on the information received from the workpiece move controller.

3 Claims, 11 Drawing Sheets

FIG. 10

LASER MACHINING SYSTEM

This application is based on and claims the benefit of priority from Japanese Patent Application No. 2018-192658, filed on 11 Oct. 2018, the content of which is incorporated herein by reference.

BACKGROUND OF THE INVENTION

Field of the Invention

The present invention relates to a system for laser machining using a laser irradiation device that irradiates a workpiece with a laser beam and a workpiece moving device that moves a workpiece.

Related Art

There has been a remote laser welding (machining) technique of welding (machining) a workpiece by irradiating a workpiece with a laser beam from a position separated from the workpiece. An existing system used as a laser machining system employing such a technique includes a scanner that scans a laser beam (laser irradiation device) and a robot that moves the scanner (a scanner moving device as an alternative to a workpiece moving device). Such a laser machining system can weld (machine) a workpiece into an arbitrary shape by making the scanner scan a laser beam while making the robot move the scanner.

Patent document 1 discloses such a laser welding device. This laser welding device includes a robot controller that controls a robot, a scanner controller that controls a scanner, and a central controller. The central controller controls both the scanner controller and the robot controller.

Patent Document 1: Japanese Unexamined Patent Application, Publication No. 2010-214393

SUMMARY OF THE INVENTION

As described above, the laser welding device disclosed in patent document 1 can weld (machine) a workpiece into an arbitrary shape by making the scanner scan a laser beam while making the robot move the scanner. In this laser welding device, however, limitations are imposed on a range of irradiation from the scanner and a movable range of the robot. This unfortunately results in a point on the workpiece where welding is impossible. In some cases, welding of a side surface or the rear surface of the workpiece becomes difficult, for example.

The present invention is intended to provide a laser machining system that reduces the occurrence of a site of a workpiece where laser machining is impossible.

(1) A laser machining system (laser machining system 1 described later, for example) according to the present invention includes: a laser irradiation device (scanner 4 described later, for example) that irradiates a workpiece (workpiece 10 described later, for example) with a laser beam; a workpiece moving device (robot 2 described later, for example) that moves the workpiece; a laser irradiation controller (scanner controller 6 described later, for example) that controls the laser irradiation device to control an irradiation position of the laser beam; and a workpiece move controller (robot controller 5 described later, for example) that controls the workpiece moving device to control at least one of the position and the posture of the workpiece. The workpiece move controller transmits information about at least one of the position and the posture of the workpiece to the laser irradiation controller. The laser irradiation controller compensates for the irradiation position of the laser beam based on the information received from the workpiece move controller.

(2) In the laser machining system described in (1), the laser irradiation device may be a scanner that scans the laser beam along a predetermined irradiation path and at a predetermined irradiation speed, the workpiece moving device may be a robot that moves the workpiece along a predetermined move path and at a predetermined move speed, the laser irradiation controller may be a scanner controller that controls the irradiation path and the irradiation speed of the scanner, the workpiece move controller may be a robot controller that controls the move path and the move speed of the robot, the robot controller may transmit information about the position and the posture of the workpiece based on the move path and the move speed of the robot to the scanner controller, and the scanner controller may compensate for the irradiation path and the irradiation speed of the scanner based on the information received from the robot controller.

(3) In the laser machining system described in (1), the laser irradiation controller may control the irradiation position of the laser beam independently of control of at least one of the position and the posture of the workpiece by the workpiece move controller.

(4) In the laser machining system described in (2), the scanner controller may control the irradiation path and the irradiation speed of the scanner independently of control of the move path and the move speed of the robot by the robot controller.

The present invention can provide a laser machining system that reduces the occurrence of a site of a workpiece where laser machining is impossible.

DETAILED DESCRIPTION OF THE INVENTION

An example of an embodiment of the present invention will be described next by referring to the accompanying drawings. In the drawings, parts equal to or corresponding to each other are identified by the same sign.

Figure 1:
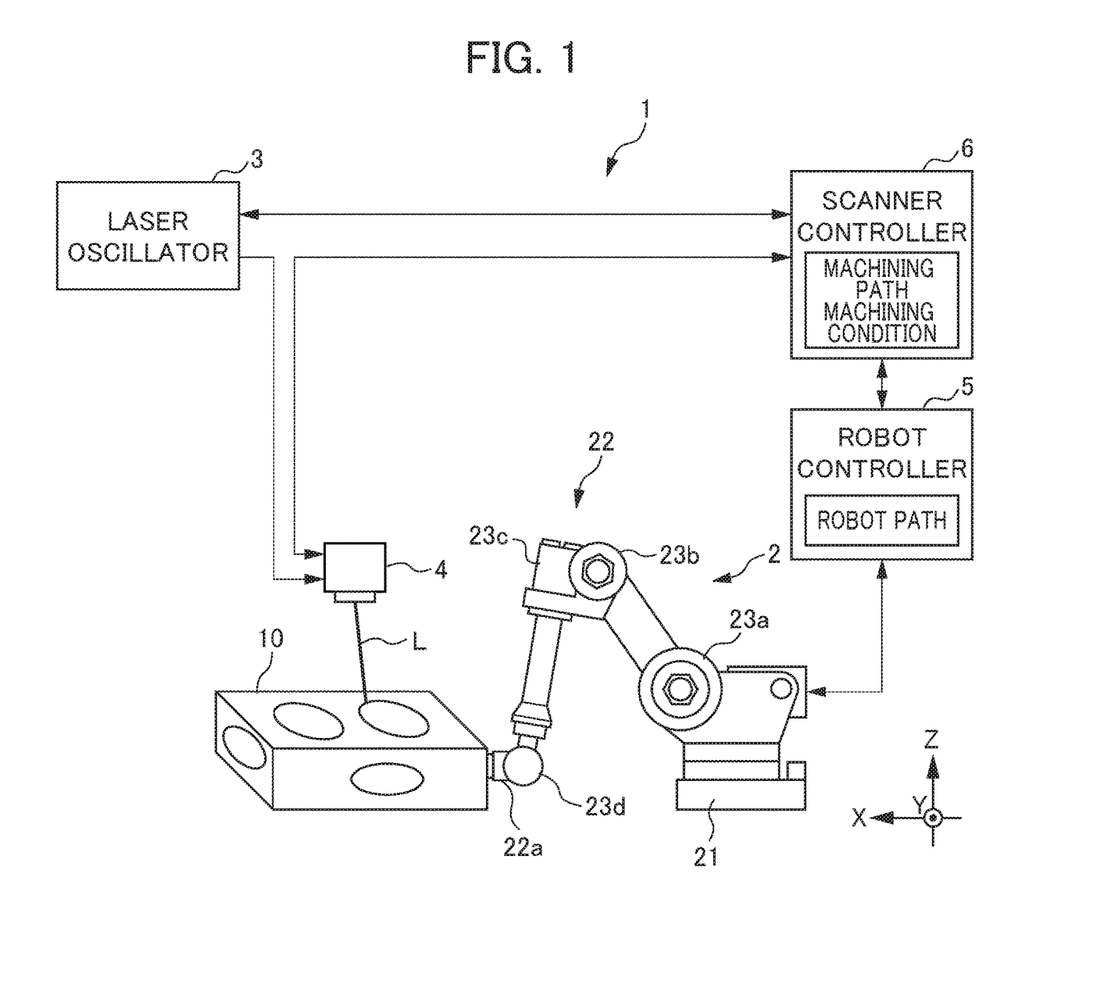
FIG. 1 shows the configuration of a laser machining system according to the present embodiment.

FIG. 1 is a block diagram showing the configuration of a laser machining system according to the present embodiment. A laser machining system 1 shown in FIG. 1 is a system for laser welding using a scanner 4 that scans a laser beam and a robot (workpiece moving device) 2 that moves a workpiece 10. The laser machining system 1 includes the robot (workpiece moving device) 2, a laser oscillator 3, the scanner (laser irradiation device) 4, a robot controller (workpiece move controller) 5, and a scanner controller (laser irradiation controller) 6.

The robot 2 is an articulated robot with multiple joints including a base 21, an arm 22, a joint axis 23a, a joint axis 23b, a joint axis 23c, and a joint axis 23d having respective rotary axes. The robot 2 includes a plurality of robot servo motors (not shown) that move the arm 22 in an X direction, a Y direction, and a Z direction by rotating each of the joint axes 23a to 23d. Each robot servo motor causes rotary drive on the basis of drive data from the robot controller 5 described later.

The workpiece 10 is fixed to a tip 22a of the arm 22 of the robot 2. This allows the robot 2 to move the workpiece 10 in the X, Y, and Z directions at a predetermined robot speed and rotate the workpiece 10 about the X, Y, and Z axes in response to the rotary drive by each robot servo motor. By doing so, the robot 2 becomes capable of moving the workpiece 10 to an arbitrary position in working space and changing the posture of the workpiece 10.

The laser oscillator 3 is composed of a laser medium, an optical resonator, an excitation source, etc. (all of which are not shown). The laser oscillator 3 generates a laser beam of a laser output based on a laser output command from the scanner controller 6 described later, and supplies the generated laser beam to the scanner 4. The type of the oscillated laser may be a fiber laser, a $CO_2$ laser, or a YAG laser, for example. In the present invention, however, a laser type is not a matter of particular concern.

Figure 2:
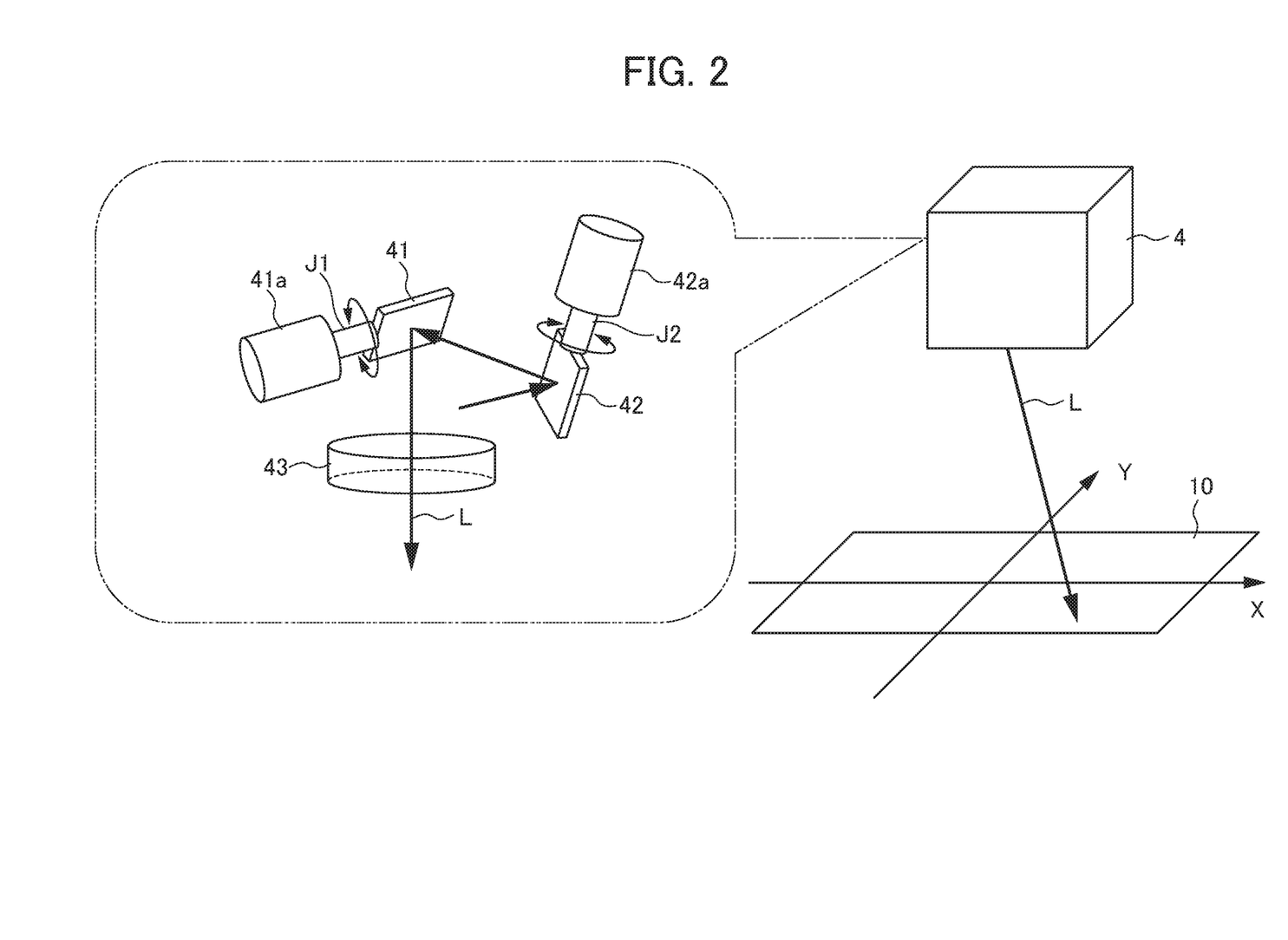
FIG. 2 explains an optical system of a scanner shown in FIG. 1.

The scanner 4 is a galvanometer scanner capable of receiving a laser beam L output from the laser oscillator 3 and scanning the laser beam L on the workpiece 10. FIG. 2 explains an optical system of the scanner 4 shown in FIG. 1. As shown in FIG. 2, the scanner 4 includes two galvanometer mirrors 41 and 42 for reflection of the laser beam L output from the laser oscillator 3, galvanometer motors 41a and 42a for rotatably driving the galvanometer mirrors 41 and 42 respectively, and a cover glass 43.

The galvanometer mirrors 41 and 42 are configured to be rotatable about two rotary axes J1 and J2 perpendicular to each other, respectively. The galvanometer motors 41a and 42a cause rotary drive on the basis of drive data from the scanner controller 6 described later to cause the galvanometer mirrors 41 and 42 to rotate independently about the rotary axes J1 and J2 respectively.

The laser beam L output from the laser oscillator 3 is reflected on the two galvanometer mirrors 41 and 42 sequentially, then output from the scanner 4, and reach a machining point (welding point) on the workpiece 10. At this time, when the two galvanometer mirrors 41 and 42 are caused to rotate by the galvanometer motors 41a and 42a respectively, input angles of the laser beam L input to the galvanometer mirrors 41 and 42 change continuously. As a result, the laser beam L is scanned from the scanner 4 on the workpiece 10 along a predetermined path, and a welding path is formed on the workpiece 10 along this scanning path of the laser beam L.

The scanning path of the laser beam L output onto to the workpiece 10 from the scanner 4 can be changed arbitrarily in the X and Y directions by controlling rotary drive by the galvanometer motors 41a and 42a appropriately and changing the respective rotation angles of the galvanometer mirrors 41 and 42.

The cover glass 43 is a circular columnar shape and has the function of transmitting the laser beam L on the way to the workpiece 10 after the laser beam L is reflected on the galvanometer mirrors 41 and 42 sequentially, and protecting the interior of the scanner 4.

Figure 3:
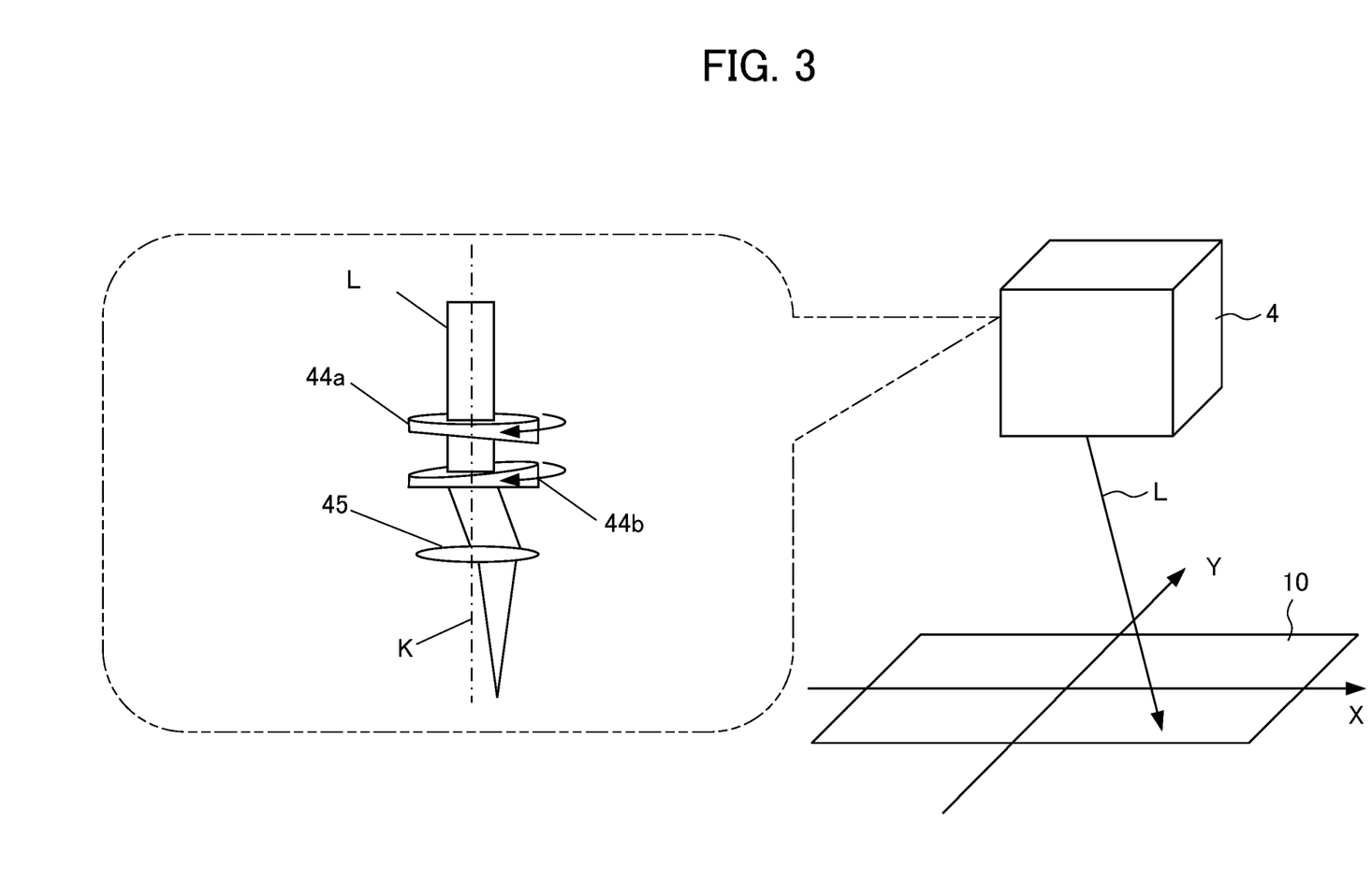
FIG. 3 explains a different optical system of the scanner shown in FIG. 1.
Figure 4A:
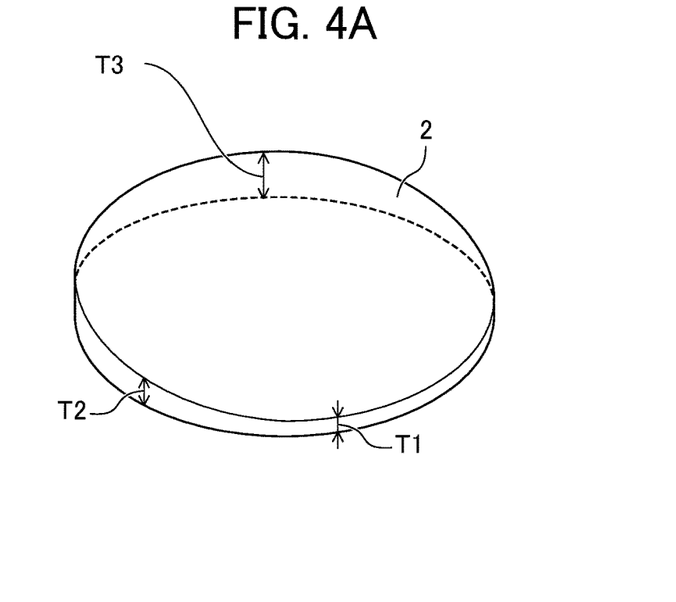
FIG. 4A explains the different optical system of the scanner shown in FIG. 3.
Figure 4B:
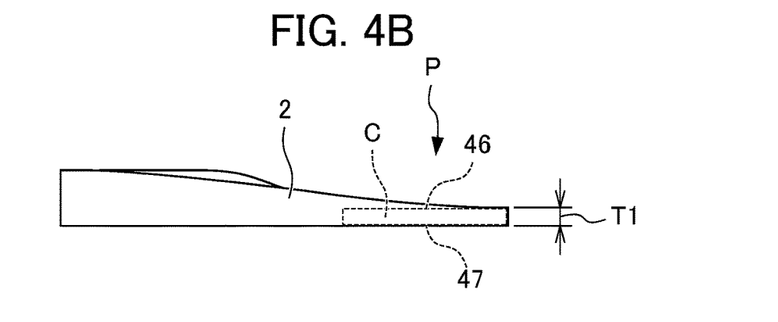
FIG. 4B explains the different optical system of the scanner shown in FIG. 3.
Figure 4C:
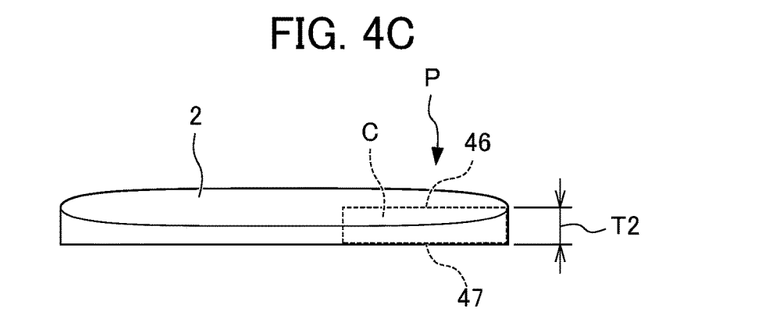
FIG. 4C explains the different optical system of the scanner shown in FIG. 3.
Figure 4D:
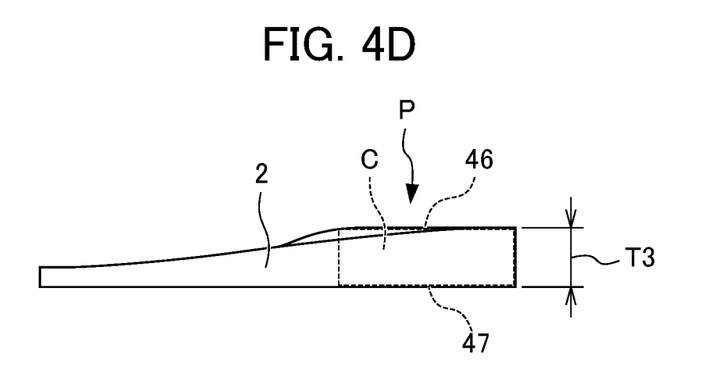
FIG. 4D explains the different optical system of the scanner shown in FIG. 3.

Alternatively, the scanner 4 may be a trepanning scanner, as shown in FIG. 3. In this case, the scanner 4 can be configured to refract an input laser beam and irradiate the refracted laser beam to an arbitrary position by making a motor rotate a lens of a shape with one tilted surface, for example.

More specifically, at the scanner 4, two prism lenses 44a and 44b (in some cases described below, these lenses may collectively be called a "prism lens 44"), and a focusing lens 45 are stacked on each other in such a manner as to input the laser beam L in a thickness direction. Rotations of the two prism lenses 44a and 44b about a rotary axis K allows control of an irradiation position on a two-dimensional plane.

As shown in FIGS. 4A to 4D, the prism lens 44 is formed into a circular shape, for example. The prism lens 44 has an input-side edge (hereinafter called an input edge) 46 and an output-side edge (hereinafter called an output edge) 47 parallel to each other viewed at a section C in a direction of a thickness T of the prism lens 44. Namely, the thickness T does not change but is constant in the radial direction of the prism lens 44. Meanwhile, the thickness T changes continuously in the peripheral direction of the prism lens 44. More specifically, as shown in FIGS. 4A to 4D, the thickness T of the prism lens 44 can take values expressed as T1 to T2 to T3, for example, and these values satisfy the following relationship: T1<T2<T3. These prism lenses 44 are configured to be caused to rotatably driven by a rotary motor and to change in the thickness T continuously in directions of the rotations.

The laser beam L input to the prism lens 44 is refracted according to the refractive index of the prism lens 44 and output as refracted light. At this time, a beam position of the laser beam L shifted by the refraction has correlation with the thickness T of the prism lens 44. More specifically, as the thickness T of the prism lens 44 at an input position P of the laser beam L becomes greater, a shift amount corresponding to the shift of the beam position of the laser beam L caused by the refraction becomes larger. By passing the laser beam L through the prism lens 44 with the thickness T changing continuously and periodically in a rotary direction, it becomes possible to change a beam position of the laser beam L, namely, an irradiation position the laser beam L continuously and periodically.

Referring back to FIG. 1, the robot controller 5 controls the operation of the robot 2 by outputting drive control data to each robot servo motor of the robot 2 in response to a predetermined working program (containing a robot move path). More specifically, the robot controller 5 moves the workpiece 10 attached to the tip 22a of the arm 22 in the X, Y, and Z directions and rotates the workpiece 10 about the X, Y, and Z axes by outputting the drive control data to each robot servo motor and controlling rotary drive by each robot servo motor. By doing so, the robot controller 5 changes the position and the posture of the robot 2, namely, the position and the posture (rotation angle, for example) of the workpiece 10. The robot controller 5 supplies the scanner controller 6 with information about the position and the posture of the robot 2, namely, the position and the posture of the workpiece 10 (a command value or a feedback value, for example). More specifically, the position of the robot 2 is the position of the tip 22a of the robot 2, namely, the position of the workpiece 10. The posture of the robot 2 is the posture of the tip 22a of the robot 2, namely, the posture of the workpiece 10 (rotation angle, for example).

The scanner controller 6 controls the operation of the scanner 4 independently of control of the operation of the robot 2 by the robot controller 5. The scanner controller 6 outputs a laser output command to the laser oscillator 3 in such a manner as to output an intended laser beam in response to a predetermined working program (containing machining conditions (laser irradiation conditions such as power, a frequency, a duty, etc.)). Further, the scanner controller 6 rotates the galvanometer mirrors 41 and 42 by outputting drive control data to the galvanometer motors 41a and 42a of the scanner 4 in response to a predetermined working program (containing a machining path), thereby controlling scanning of the laser beam L output from the scanner 4 to the workpiece 10.

The robot controller 5 and the scanner controller 6 are each configured using an operation processor such as a digital signal processor (DSP) or a field-programmable gate array (FPGA), for example. The functions of the robot controller 5 and the scanner controller 6 are realized by executing predetermined software (program) stored in a storage unit, for example. The functions of the robot controller 5 and the scanner controller 6 may be realized by collaboration of hardware and software, or only by hardware (electronic circuit).

Figure 5:
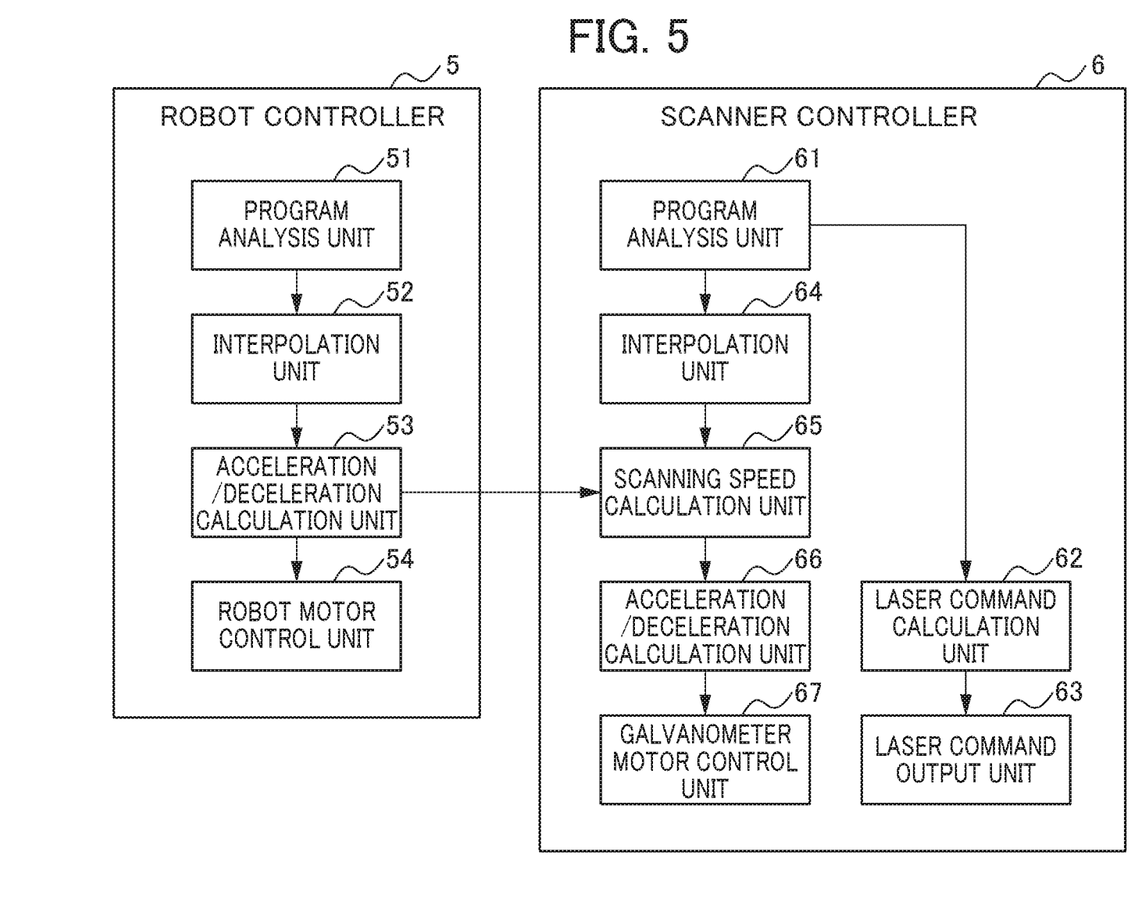
FIG. 5 shows the configurations of a robot controller and a scanner controller shown in FIG. 1.

Next, the configurations of the robot controller 5 and the scanner controller 6 will be described in more detail. FIG. 5 shows the configurations of the robot controller 5 and the scanner controller 6 in the laser machining system 1 according to the present embodiment. The robot controller 5 includes a program analysis unit 51, an interpolation unit 52, an acceleration/deceleration calculation unit 53, and a robot motor control unit 54.

The program analysis unit 51 analyzes a machining program containing teaching points input from an input unit (not shown) to the robot controller 5 to generate operation command information about a move path of the robot 2 (namely, a move path of the workpiece 10 attached to the tip 22a) and a target move speed of the robot 2. The generated operation command information is output to the interpolation unit 52.

The interpolation unit 52 interpolates a move path of the robot 2 on the basis of the operation command information output from the program analysis unit 51 to generate interpolation information. For example, the interpolation unit 52 interpolates the move path in such a manner that the move path of the robot 2 (namely, the move path of the workpiece 10 attached to the tip 22a) between the teaching points becomes a smooth path along an intended machining path. The generated interpolation information is output to the acceleration/deceleration calculation unit 53.

The acceleration/deceleration calculation unit 53 performs process for accelerating/decelerating the operation of the robot 2 on the basis of the interpolation information output from the interpolation unit 52 and each parameter set in advance, thereby generating drive information about each robot servo motor for moving the robot 2 (namely, the workpiece 10 attached to the tip 22a) along the move path of the robot 2. The generated drive information about each robot motor is output to the robot motor control unit 54. The drive information contains a command value for the position and the posture of the robot 2 (the position and the posture (rotation angle, for example) of the workpiece 10 attached to the tip 22a) and a command value for a move speed. The information about the command value for the position and the posture of the robot 2 (the position and the posture (rotation angle, for example) of the workpiece 10 attached to the tip 22a) is further supplied to the scanner controller 6.

The robot motor control unit 54 generates drive data about each robot servo motor on the basis of the drive information output from the acceleration/deceleration calculation unit 53. More specifically, the robot motor control unit 54 generates the drive data about each robot servo motor on the basis of a speed error (or positional error) between the speed command (or positional command) contained in the drive information and a speed feedback (or positional feedback) detected by an encoder provided at each robot servo motor. The robot motor control unit 54 drives each robot servo motor on the basis of the generated drive data.

The scanner controller 6 includes a program analysis unit 61, a laser command calculation unit 62, a laser command output unit 63, an interpolation unit 64, a scanning speed calculation unit 65, an acceleration/deceleration calculation unit 66, and a galvanometer motor control unit 67.

The program analysis unit 61 analyzes a machining program input from an input unit (not shown) to the scanner controller 6 to generate operation command information about a scanning path (irradiation path) and a scanning speed (irradiation speed) of the scanner 4 and about a machining condition. The program analysis unit 61 outputs the generated operation command information to the interpolation unit 64 and the laser command calculation unit 62.

The laser command calculation unit 62 generates such laser output information as will produce an intended laser output of the laser beam L output from the scanner 4 on the basis of the operation command information (machining condition) output from the program analysis unit 61 to generate oscillation information about the laser oscillator 3 on the basis of the generated laser output information. The generated oscillation information about the laser oscillator 3 is output to the laser command output unit 63.

The laser command output unit 63 generates oscillation control data about the laser oscillator 3 on the basis of the oscillation information output from the laser command calculation unit 62, and controls the laser oscillator 3 on the basis of the generated oscillation control data.

The interpolation unit 64 interpolates a scanning path (irradiation path) of the scanner 4 on the basis of the operation command information (scanning path) output from the program analysis unit 61 to generate interpolation information. The generated interpolation information is output to the scanning speed calculation unit 65.

When a mode in which the robot 2 operates is on, the scanning speed calculation unit 65 compensates for the interpolation information (scanning path) output from the interpolation unit 64 by giving consideration to the operation of the robot 2 on the basis of the interpolation information (scanning path) output from the interpolation unit 64 and the information acquired from the acceleration/deceleration calculation unit 53 of the robot controller 5 about the position and the posture of the robot 2 (the command value for the position and the posture (rotation angle, for example) of the workpiece 10 attached to the tip 22*a*, or the feedback value from the encoder at each robot servo motor). The scanning speed calculation unit 65 calculates a rotation speed of each of the galvanometer mirrors 41 and 42 on the basis of the compensated interpolation information (scanning path) and a parameter set in advance. Meanwhile, when the mode is off so the robot 2 does not operate, the scanning speed calculation unit 65 does not compensate for the interpolation information (scanning path) by giving consideration to the operation of the robot 2 but it calculates a rotation speed of each of the galvanometer mirrors 41 and 42 on the basis of the interpolation information (scanning path) output from the interpolation unit 64 and a parameter set in advance. Data about the rotation speed calculated by the scanning speed calculation unit 65 is output to the acceleration/deceleration calculation unit 66.

The acceleration/deceleration calculation unit 66 performs process for accelerating/decelerating the galvanometer motors 41*a* and 42*a* on the basis of the information about the rotation speeds of the galvanometer mirrors 41 and 42 and each parameter output from the scanning speed calculation unit 65, thereby generating drive information about each of the galvanometer motors 41*a* and 42*a* for scanning the laser beam L along the scanning path (irradiation path) and at the scanning speed (irradiation speed). The generated drive information about each of the galvanometer motors 41*a* and 42*a* is output to the galvanometer motor control unit 67.

The galvanometer motor control unit 67 generates drive control data about each of the galvanometer motors 41*a* and 42*a* on the basis of the drive information output from the acceleration/deceleration calculation unit 66, and drives each of the galvanometer motors 41*a* and 42*a* on the basis of the generated drive control data.

Figure 9:
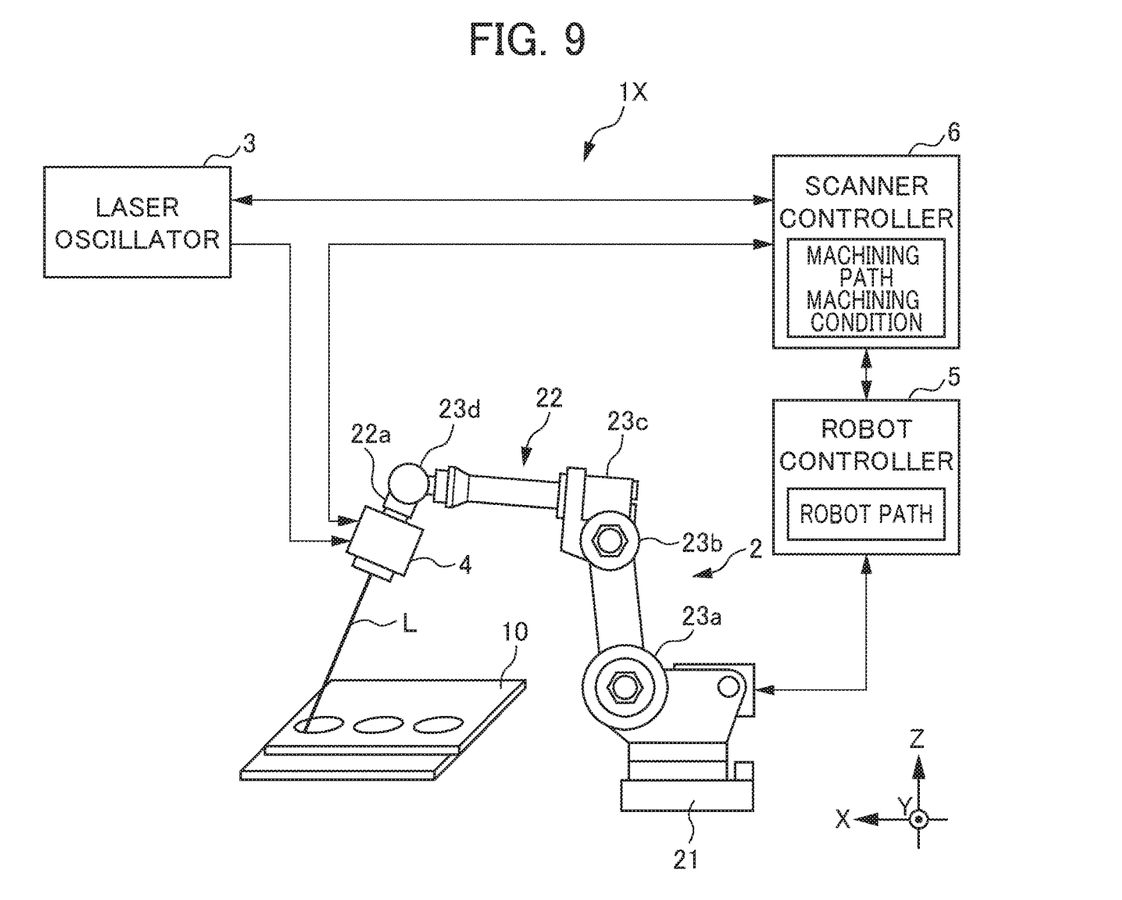
FIG. 9 shows the configuration of a conventional laser machining system.

FIG. 9 shows the configuration of a conventional laser machining system. In a conventional laser machining system 1X, the robot 2 grasps the scanner 4 instead of grasping the workpiece 10 (see patent document 1 mentioned above, for example). More specifically, the conventional laser machining system 1X includes the scanner 4 that scans a laser beam, and the robot 2 that moves the scanner 4. The conventional laser machining system 1X can weld (machine) a workpiece into an arbitrary shape by making the scanner 4 scan a laser beam while making the robot 2 move the scanner 4. In the conventional laser machining system 1X, the robot controller 5 and the scanner controller 6 operate independently under respective working programs. In the conventional laser machining system 1X, a move path and a move speed of the robot 2 are controlled by the robot controller 5 independently of a scanning path (irradiation path) and a scanning speed (irradiation speed) of the scanner 4 controlled by the scanner controller 6. To achieve this, while the robot 2 is operating, the position or the posture of the robot 2 is transmitted from the robot controller 5 to the scanner controller 6, and a scanning path is generated in the scanner controller 6 by giving consideration to the operation of the robot 2.

Figure 10:
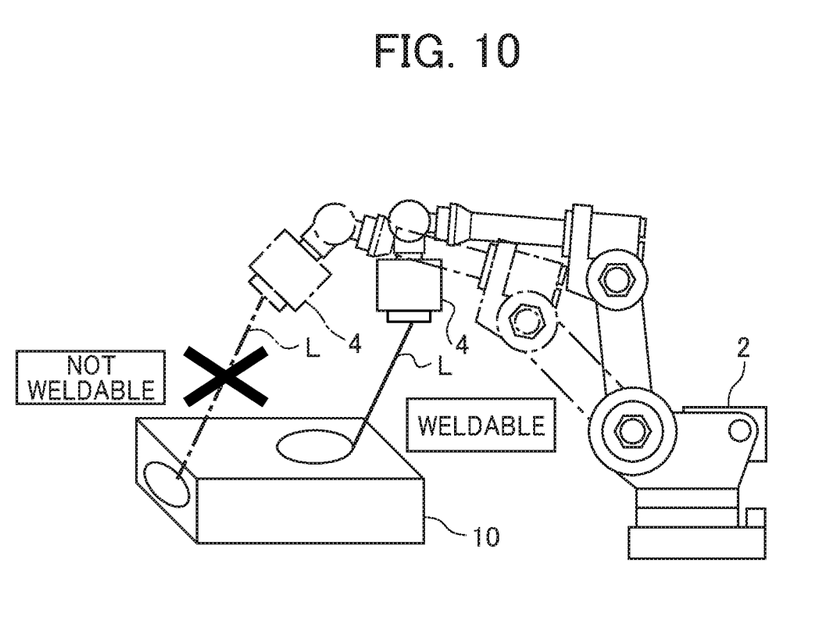
FIG. 10 explains a problem occurring in the conventional laser machining system.

In the conventional laser machining system 1X, however, limitations are imposed on a range of irradiation from the scanner 4 and a movable range of the robot 2. This unfortunately results in a point on the workpiece 10 where welding is impossible. This may cause a case in the conventional laser machining system 1X such as that shown in FIG. 10 where, while the upper surface of the workpiece 10 is weldable, a part of a side surface of the workpiece 10 (a side surface of the workpiece 10 on the opposite side of a side surface closer to the robot 2) and the rear surface of the workpiece 10 are not weldable, for example.

In this regard, in the laser machining system 1 of the embodiment, the robot 2 grasps the workpiece 10, the robot controller 5 changes the position and the posture (rotation angle) of the workpiece 10, and feeds the changed position and the changed posture (rotation angle) of the workpiece 10 back to the scanner controller 6. Then, the scanner controller 6 compensates for a scanning path and a scanning speed of the scanner 4 by giving consideration to the position and the posture (rotation angle) of the workpiece 10.

Figure 6:
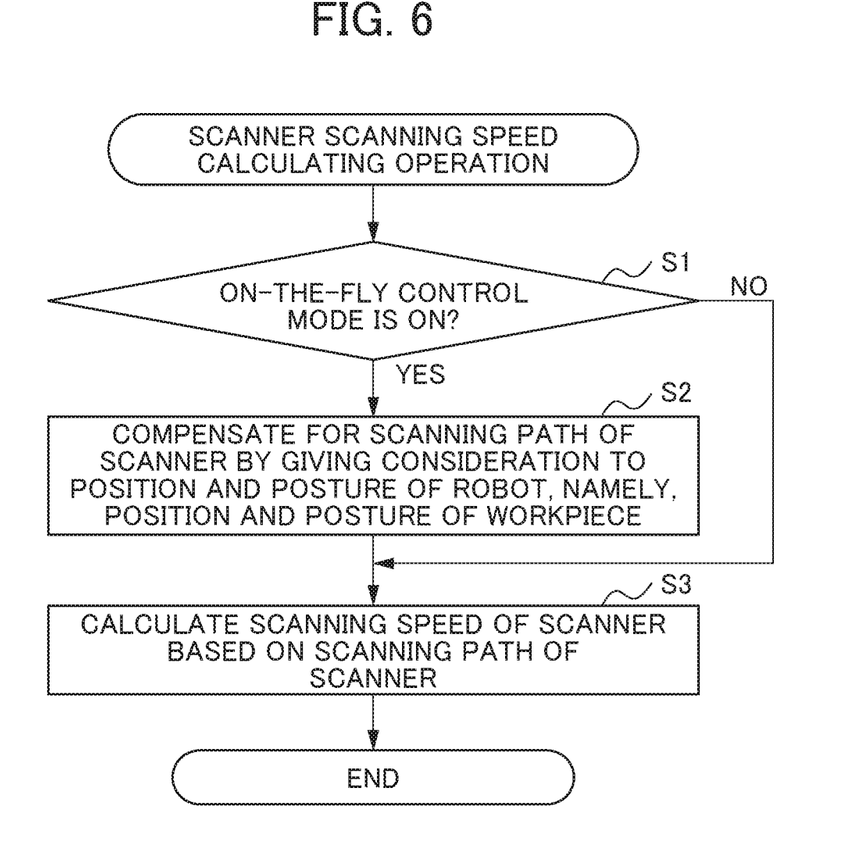
FIG. 6 is a flowchart showing a scanner scanning speed calculating operation performed by the scanner controller in the laser machining system according to the present embodiment.

The following describes how the robot controller 5 and the scanner controller 6 compensate for a scanning path and a scanning speed of the scanner 4 in the laser machining system 1 by referring to FIG. 6. FIG. 6 is a flowchart showing a scanner scanning speed calculating operation performed by the scanner controller 6 in the laser machining system 1.

First, the workpiece 10 is placed and the robot 2 grasps the workpiece 10. This state of the robot 2 is defined as a reference position and a reference posture of the robot 2. A target shape of a workpiece to be welded (three-dimensional shape, for example) in these reference position and reference posture of the robot 2 is programmed into the robot controller 5 and the scanner controller 6.

When the mode in which the robot 2 operates is turned on (when an on-the-fly control mode is turned on) in these reference position and reference posture of the robot 2, the robot controller 5 and the scanner controller 6 make a match between a robot coordinate system and a scanner coordinate system.

When the mode is turned on (when the on-the-fly control mode is turned on), the acceleration/deceleration calculation unit 53 of the robot controller 5 transmits information about the position and the posture of the robot 2, namely, the position and the posture (rotation angle) of the workpiece 10 attached to the tip 22*a* to the scanner controller 6. The acceleration/deceleration calculation unit 53 transmits the information about the position and the posture (rotation angle) of the workpiece 10 at predetermined time intervals, for example.

When the mode is turned on (when the on-the-fly control mode is turned on) (YES in S1 of FIG. 6), the scanning speed calculation unit 65 of the scanner controller 6 compensates for a scanning path of the scanner 4 interpolated by the interpolation unit 64 by giving consideration to the operation of the robot 2 on the basis of the information acquired from the acceleration/deceleration calculation unit 53 of the robot controller 5 about the position and the posture of the robot 2, namely, the position and the posture (rotation angle) of the workpiece 10 (S2 of FIG. 6). Then, the scanning speed calculation unit 65 calculates a scanning speed of the scanner 4 on the basis of the compensated scanning path of the scanner 4 (S3 of FIG. 6).

Meanwhile, when the mode is off (when the on-the-fly control mode is off) (NO in S1 of FIG. 6), the scanning speed calculation unit 65 does not compensate for the scanning path of the scanner 4 by giving consideration to the operation of the robot 2 but it calculates a scanning speed of the scanner 4 on the basis of the scanning path of the scanner 4 interpolated by the interpolation unit 64 (S3 of FIG. 6).

Figure 7:
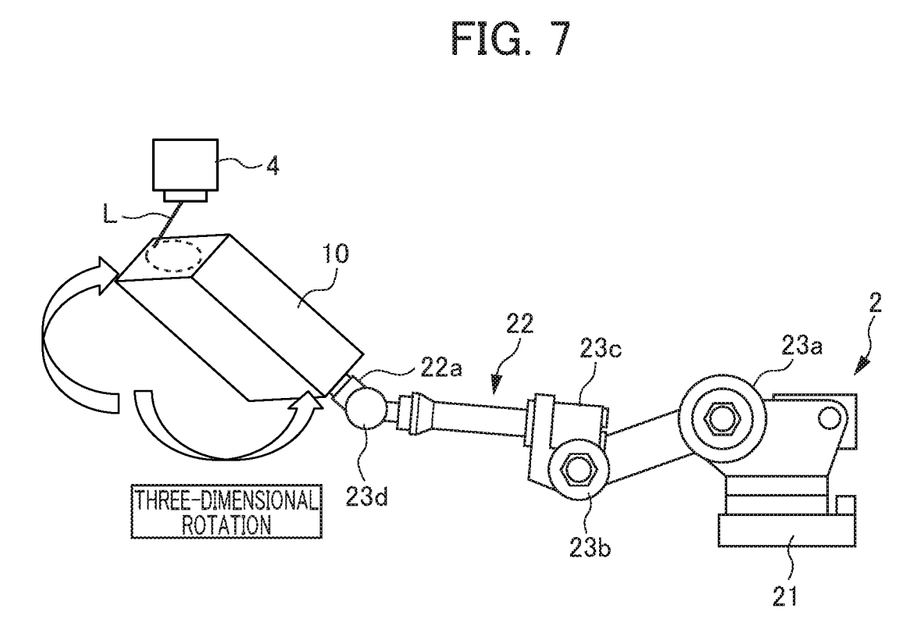
FIG. 7 explains an advantage of the laser machining system according to the present embodiment.

As described above, in the laser machining system 1 of the present embodiment, the robot 2 grasps the workpiece 10, the robot controller 5 changes the position and the posture (rotation angle) of the workpiece 10, and feeds the changed position and the changed posture (rotation angle) of the workpiece 10 back to the scanner controller 6. Then, the scanner controller 6 compensates for a scanning path and a scanning speed of the scanner 4 by giving consideration to the position and the posture (rotation angle) of the workpiece 10. This makes it possible to reduce the occurrence of a site of a workpiece where laser machining is impossible. As shown in FIG. 7, for example, a part of a side surface of the workpiece 10 (a side surface of the workpiece 10 on the opposite side of a side surface closer to the robot 2, for example) and the rear surface of the workpiece 10 can be welded by the laser machining system 1 of the embodiment.

(Modifications)

Figure 8:
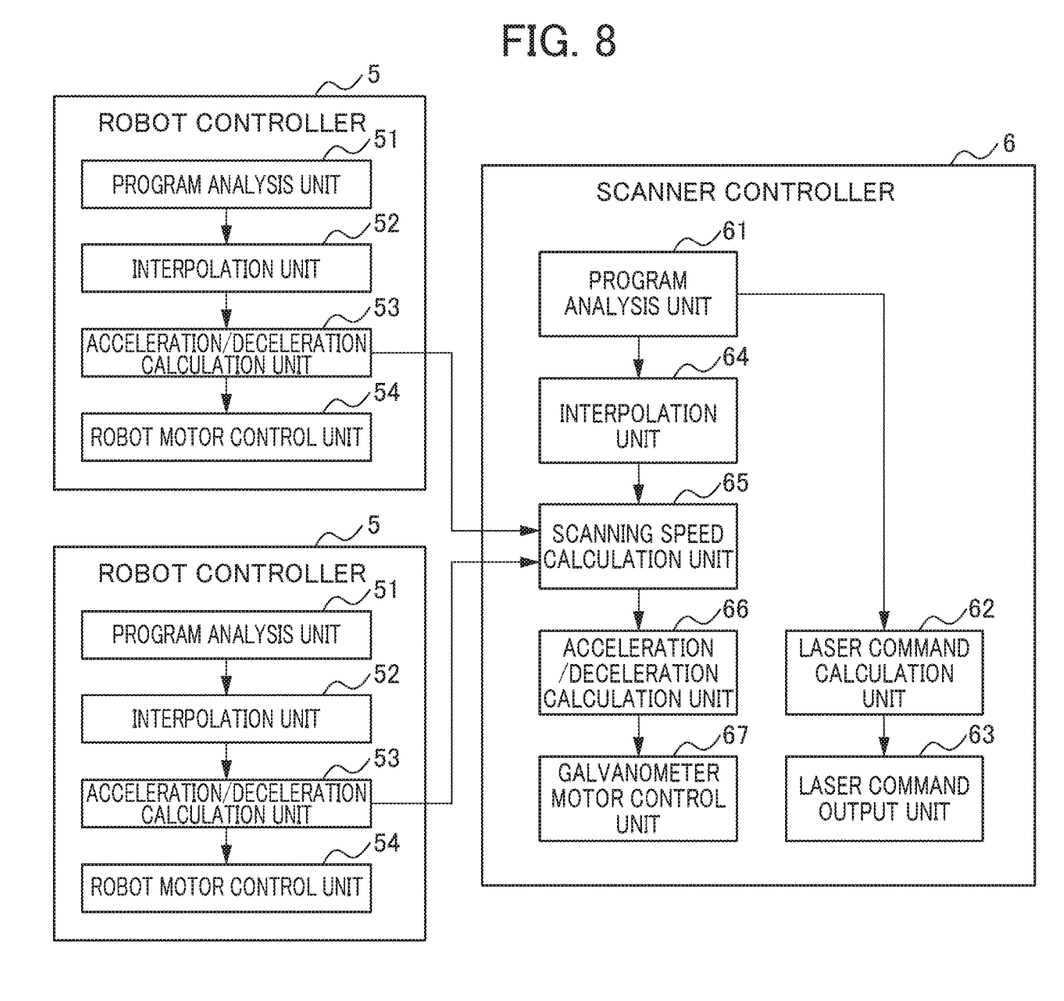
FIG. 8 shows the configurations of a robot controller and a scanner controller in the laser machining system according to a modification of the present embodiment.

While the scanner 4 is fixedly installed in the laser machining system 1 of the present embodiment, the scanner 4 may also be movable. For example, the laser machining system 1 may further include a robot 2 for moving the scanner 4. In this case, as shown in FIG. 8, the laser machining system 1 further includes a robot controller 5 for grasping the scanner 4 and controlling the position and the posture (rotation position) of the scanner 4. This robot controller 5 transmits the position and the posture (rotation position) of the scanner 4 to the scanner controller 6. The scanner controller 6 may compensate for a scanning path and a scanning speed of the scanner 4 by giving consideration to the position and the posture (rotation position) of the scanner 4 in addition to the position and the posture (rotation angle) of the workpiece 10.

While the embodiment of the present invention has been described above, the present invention should not be limited to the foregoing embodiment but can be changed and modified in various ways. For example, the laser welding system for laser welding described as an example in the foregoing embodiment is not a limited system. The features of the present embodiment are applicable to a system that performs various types of laser machining such as laser cutting, etc. using a scanner that scans a laser beam and a robot that moves the scanner.

The laser machining system described as an example in the foregoing embodiment includes a scanner that scans a laser beam on a workpiece. However, this is not a limited system. The features of the present embodiment are applicable to a laser machining system including various types of laser irradiation devices that irradiate a workpiece with laser beams. The laser machining system described as an example in the foregoing embodiment includes a robot that moves a workpiece along a predetermined move path and at a predetermined move speed. However, this is not a limited system. The features of the present embodiment are applicable to a laser machining system including various types of workpiece moving devices instead of a robot that move a workpiece. In this case, a workpiece move controller as an alternative to a robot controller may transmit the position and the posture of a workpiece, and a laser irradiation controller as an alternative to a scanner controller may compensate for an irradiation position of a laser on the basis of the transmitted position and the transmitted posture of the workpiece.

In the laser machining system described as an example in the foregoing embodiment, the robot controller controls both the position and the posture of a workpiece. However, this is not a limited robot controller. For example, if the robot controller is to control only one of the position and the posture of the workpiece, the robot controller may transmit information about one of the position and the posture of the workpiece to the scanner controller, and the scanner controller may compensate for a scanning path and a scanning speed of the scanner (irradiation position of a laser beam) on the basis of the information about one of the position and the posture of the workpiece received from the robot controller.

EXPLANATION OF REFERENCE NUMERALS

1 Laser machining system
2 Robot
3 Laser oscillator
4 Scanner
41, 42 Galvanometer mirror
41a, 42a Galvanometer motor
5 Robot controller
51 Program analysis unit
52 Interpolation unit
53 Acceleration/deceleration calculation unit
54 Robot motor control unit
6 Scanner controller
61 Program analysis unit
62 Laser command calculation unit
63 Laser command output unit
64 Interpolation unit
65 Scanning speed calculation unit
66 Acceleration/deceleration calculation unit
67 Galvanometer motor control unit
10 Workpiece

What is claimed is:

1. A laser machining system comprising: a laser irradiation device that irradiates a workpiece with a laser beam;
a workpiece moving device that moves the workpiece;
a laser irradiation controller that controls the laser irradiation device to control an irradiation position of the laser beam; and
a workpiece move controller that controls the workpiece moving device to control a position and a posture of the workpiece, wherein
the workpiece move controller transmits information about at least one of the position and the posture of the workpiece to the laser irradiation controller,
the laser irradiation controller compensates for the irradiation position of the laser beam based on the information received from the workpiece move controller,
the laser irradiation device is a scanner that scans the laser beam along a predetermined irradiation path and at a predetermined irradiation speed,
the workpiece moving device is a robot that moves the workpiece along a predetermined move path and at a predetermined move speed,
the laser irradiation controller is a scanner controller that controls the irradiation path and the irradiation speed of the scanner,
the workpiece move controller is a robot controller that controls the move path and the move speed of the robot,
the robot controller transmits information about the position and the posture of the workpiece based on the move path and the move speed of the robot to the scanner controller, and
the scanner controller compensates for the irradiation path and the irradiation speed of the scanner based on the information received from the robot controller.

2. The laser machining system according to claim 1, wherein the laser irradiation controller controls the irradiation position of the laser beam independently of control of at least one of the position and the posture of the workpiece by the workpiece move controller.

3. The laser machining system according to claim 1, wherein the scanner controller controls the irradiation path and the irradiation speed of the scanner independently of control of the move path and the move speed of the robot by the robot controller.

\* \* \* \* \*